US012346132B2

(12) United States Patent
Al-Qahtani et al.

(10) Patent No.: US 12,346,132 B2
(45) Date of Patent: Jul. 1, 2025

(54) IDENTIFYING AND REMEDIATING A GAS LEAK (71) Applicant: Saudi Arabian Oil Company, Dhahran (SA)

(72) Inventors: Salem D. Al-Qahtani, Dammam (SA); Soliman A. Al-Walaie, Dhahran (SA); Zahir Fartas, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 209 days.

(21) Appl. No.: 17/950,763

(22) Filed: Sep. 22, 2022

(65) Prior Publication Data
US 2024/0103536 A1    Mar. 28, 2024

(51) Int. Cl.
  *G05D 1/00* (2024.01)
  *B64D 35/04* (2006.01)
  *B64U 10/14* (2023.01)
  *B64U 20/87* (2023.01)
  *F17D 5/00* (2006.01)
  (Continued)

(52) U.S. Cl.
  CPC ............. *G05D 1/106* (2019.05); *B64D 35/04* (2013.01); *B64U 10/14* (2023.01); *B64U 20/87* (2023.01); *F17D 5/005* (2013.01); *F17D 5/02* (2013.01); *F23Q 21/00* (2013.01); *G08G 5/32* (2025.01);
  (Continued)

(58) Field of Classification Search
  None
  See application file for complete search history.

(56) References Cited

U.S. PATENT DOCUMENTS 6,422,508 B1 * 7/2002 Barnes ................ G01J 3/06
                                                342/63
9,340,267 B2   5/2016 Lambertus et al.
  (Continued)

FOREIGN PATENT DOCUMENTS

CN    215112740    12/2021

OTHER PUBLICATIONS

Saeid Asadzadeh et al. "UAV-based remote sensing for the petroleum industry and environmental monitoring: State-of-the-art and perspectives," available online @ https://www.sciencedirect.com/science/article/pii/S0920410521012675; last accessed 20240612 (Year: 2021).*

(Continued)

*Primary Examiner* — Daniel L Greene
(74) *Attorney, Agent, or Firm* — Fish & Richardson P.C.

(57) ABSTRACT

A method and an unmanned aerial vehicle for identifying and remediating a gas leak. The method includes flying the unmanned aerial vehicle towards a possible location of the gas leak, then detecting a first condition indicative of the gas leak with a first sensor and sensing environmental conditions near the gas leak with an environmental sensor. The method includes receiving, by a controller, a signal representing the first condition indicative of the gas leak and a signal representing the environmental conditions. The method includes determining, based on the first condition indicative of the gas leak and the environmental conditions near the gas leak, a flight plan including an ignition zone. The method includes positioning, based on the flight plan, the unmanned aerial vehicle relative to the ignition zone and discharging, by an ignition mechanism, an ignition source into the gas leak to ignite the gas leak.

23 Claims, 6 Drawing Sheets (51) Int. Cl.
*F17D 5/02* (2006.01)
*F23Q 21/00* (2006.01)
*G08G 5/32* (2025.01)
*G08G 5/55* (2025.01)
*G08G 5/57* (2025.01)
*B64U 30/20* (2023.01)
*B64U 101/30* (2023.01)

(52) U.S. Cl.
CPC ............... *G08G 5/55* (2025.01); *G08G 5/57* (2025.01); *B64U 30/20* (2023.01); *B64U 2101/30* (2023.01)

(56) References Cited

U.S. PATENT DOCUMENTS

| | | | |
|---|---|---|---|
| 9,405,533 | B2 | 8/2016 | Bouzas et al. |
| 9,669,245 | B2 | 6/2017 | Baron |
| 10,520,387 | B2 | 12/2019 | Wang et al. |
| 10,955,294 | B2 | 3/2021 | Podmore et al. |
| 2014/0062754 | A1 | 3/2014 | Mohamadi |
| 2014/0284465 | A1* | 9/2014 | Pottorf ............... G01V 9/007 250/253 |
| 2014/0357929 | A1* | 12/2014 | Nedwed ............... A62D 3/40 701/2 |
| 2015/0350569 | A1* | 12/2015 | Espersen ............. H04N 23/45 348/164 |
| 2016/0214715 | A1* | 7/2016 | Meffert ............... G01S 17/88 |
| 2018/0292286 | A1 | 10/2018 | Dittberner et al. |
| 2018/0292374 | A1* | 10/2018 | Dittberner ........... G05D 1/0088 |
| 2019/0068953 | A1* | 2/2019 | Choi ................. G02B 26/0833 |
| 2019/0204189 | A1* | 7/2019 | Mohr, Jr. ............ G01N 21/00 |
| 2019/0367169 | A1 | 12/2019 | O'Leary |
| 2020/0249092 | A1* | 8/2020 | Podmore ............... G01J 3/0205 |
| 2021/0116215 | A1* | 4/2021 | Townsend .............. F41G 3/22 |
| 2022/0250747 | A1* | 8/2022 | Kominami ............. B05B 12/14 |

OTHER PUBLICATIONS

U.S. Appl. No. 17/950,757, filed Sep. 22, 2022, Al-Walaie.
U.S. Appl. No. 17/950,763, filed Sep. 22, 2022, Al-Qahtani.
gexcon.com [online], "Oil and Gas," Gexcon, available on or before Aug. 25, 2018, retrieved on Dec. 29, 2022 from URL <https://www.gexcon.com/us/products-services/Oil-and-Gas/11/en>, 4 pages.
Jiang et al., "Real-time risk assessment of explosion on offshore platform using Bayesian network and CFD," Journal of Loss Prevention in the Process Industries, Sep. 2021, 72, 104518, 11 pages.
Jiao et al., "Development of Flammable Dispersion Quantitative Property-Consequence Relationship Models Using Extreme Gradient Boosting," Ind. Eng. Chem. Res. Jul. 2021, 59, 33, 15109-15118, 10 pages.
Jin and Jang, "Probabilistic explosion risk analysis for offshore topside process area. Part I: A new type of gas cloud frequency distribution for time-varying leak rates," Journal of Loss Prevention in the Process Industries, Jan. 2018, 51: 125-136, 12 pages.
Juwari, "Simulation of Natural Gas Dispersion and Explosion in Vented Enclosure using 3D CFD FLACS Software," IOP Conference Series: Materials Science and Engineering, 2020, 778: 012144, 13 pages.
walkera.com [online], "QL 1800," Walkera, available on or before 2017, retrieved on Dec. 28, 2022 from URL <https://en.walkera.com/index.php/Goods/info/id/79.html>, 7 pages.
Yang et al., "Accident modeling of toxic gas-containing flammable gas release and explosion on an offshore platform," Journal of Loss Prevention in the Process Industries, May 2020, 65: 104118, 9 pages.

* cited by examiner

IDENTIFYING AND REMEDIATING A GAS LEAK

TECHNICAL FIELD

This disclosure relates to identifying and remediating a gas leak, in particular, by using a unmanned surface vehicle or an unmanned aerial vehicle.

BACKGROUND

Hydrocarbons in the form of fluids and gases are produced from wells, conducted through pipelines, and processed in refinery plants or processing facilities. The wells, pipelines, refinery plants, and processing facilities can be onshore or offshore. In some cases, the hydrocarbons can leak from the wells, pipelines, refinery plants, and processing facilities.

SUMMARY

This disclosure describes methods and systems related to identifying and remediating a gas leak with an unmanned vehicle, for instance, with an unmanned surface vehicle or an unmanned aerial vehicle. In these systems and methods, the unmanned vehicle detects the gas leak, is positioned near to the gas leak, and ignites the gas leak.

In one aspect, a method for identifying and remediating a gas leak using an unmanned aerial vehicle includes flying the unmanned aerial vehicle towards a possible location of the gas leak. The method includes detecting, by a first sensor of the unmanned aerial vehicle, a first condition indicative of the gas leak and sensing, by an environmental sensor of the unmanned aerial vehicle, multiple environmental conditions of an environment near the gas leak. The method includes receiving, by a controller operatively coupled to the unmanned aerial vehicle, a signal representing the first condition indicative of the gas leak and a signal representing the multiple environmental conditions near the gas leak. The method includes determining, by the controller and based on the first condition indicative of the gas leak and the multiple environmental conditions near the gas leak, a flight plan including an ignition zone. The method includes positioning, based on the flight plan, the unmanned aerial vehicle relative to the ignition zone. The method includes discharging, by an ignition mechanism of the unmanned aerial vehicle, an ignition source into the gas leak to ignite the gas leak.

In some implementations, the first sensor is a thermal sensor and detecting the first condition indicative of the gas leak includes detecting a temperature difference of the gas leak relative to the environment.

In some implementations, the first sensor is an optical sensor and detecting the first condition indicative of the gas leak includes detecting an optical parameter of the gas leak relative to the environment.

In some implementations, the environmental conditions include at least one of wind speed, wind direction, ambient temperature, humidity, pressure, an obstacle, or terrain.

In some implementations, determining the flight plan includes determining a starting location of the unmanned aerial vehicle; determining of a source of the gas leak; and determining a route including multiple waypoints from the starting location to the ignition zone. In some cases, determining the flight plan includes determining an altitude for each of the waypoints.

In some implementations, discharging, by the ignition mechanism of the unmanned aerial vehicle, the ignition source into the gas leak includes aiming the ignition mechanism at the gas leak.

In some implementations, the ignition source includes at least one of a flame, a flammable gel, a fire ball, or a spark.

In some implementations, discharging the ignition source into the gas leak to ignite the gas leak is at a first time, and the method further includes, at a second time after the first time, detecting, by the first sensor, a second condition indicative of the gas leak continuing; sensing, by the environmental sensor, a second set of environmental conditions near the gas leak; receiving, by the controller, a signal representing the second condition indicative the gas leak continuing and a signal representing the second set of environmental conditions near the gas leak; determining, by the controller and based on the second condition indicative of the gas leak and the second set of environmental conditions near the gas leak, that another discharge by the ignition mechanism into the gas leak is needed; and discharging, by the ignition mechanism, the ignition source into the gas leak to ignite the gas leak at the second time.

In some implementations, the gas leak is from at least one of an offshore gas processing facility, an onshore gas processing facility, an offshore drilling rig, an onshore drilling rig, or a pipeline.

In another aspect, an unmanned aerial vehicle controls a gas leak. The unmanned aerial vehicle includes a gas leak sensor to detect a condition indicative of the gas leak and an environmental sensor to detect an environmental condition indicative of an environment near the gas leak. The unmanned aerial vehicle includes an ignition mechanism to discharge an ignition source. The unmanned aerial vehicle includes a controller operatively coupled to the gas leak sensor, the environmental sensor, and the ignition mechanism. The controller performs operations including receiving a signal representing the condition of the gas leak from the gas leak sensor; receiving the signal representing the condition of the gas leak from the environmental sensor; determining, based on the condition of the gas leak and the environmental condition indicative of an environment near the gas leak, a flight plan including an ignition zone; positioning, based on the flight plan, the unmanned aerial vehicle relative to the ignition zone; and discharging the ignition source by the ignition mechanism into the gas leak to ignite the gas leak.

In some implementations, the gas leak sensor includes at least one of a thermal camera or an optical camera.

In some implementations, the environmental sensor includes at least one of camera, a radar, a global positioning system, an inertial navigation system, an acoustic sensor, a laser, a light detection and ranging (LIDAR) sensor, a temperature sensor, a pressure sensor, a humidity sensor, a wind speed sensor, or a wind direction sensor.

In some implementations, the ignition mechanism includes an actuator and at least one of a flammable gas source to flow a flammable gas stream, a flammable gas ball, a flammable gel source, or a spark emitter.

In some implementations, the ignition mechanism includes a gimbal to aim the ignition mechanism at the gas leak.

In some implementations, the unmanned aerial vehicle further includes a propulsion sub-system to position the unmanned aerial vehicle. The propulsion sub-system includes a motor operatively controlled by the controller and multiple propellers coupled to the motor.

In some implementations, the unmanned aerial vehicle further includes a power sub-system having a battery.

In some implementations, the unmanned aerial vehicle further includes a communications sub-system including an antenna to transmit and receive control signals and status signals from the controller to a user.

In another aspect, a method includes detecting a gas leak; positioning an unmanned aerial vehicle proximal to the gas leak; and discharging, by the unmanned aerial vehicle, an ignition source into the gas leak.

In some implementations, positioning the unmanned aerial vehicle proximal to the gas leak includes positioning the unmanned aerial vehicle relative to an ignition zone of the gas leak. In some cases, the ignition zone is defined by a range in which an ignition mechanism of the unmanned aerial vehicle can deploy an ignition source into the gas leak. In some cases, positioning the unmanned aerial vehicle includes determining the ignition zone for the gas leak based on a condition indicative of the gas leak and an environmental condition indicative of an environment near the gas leak.

Implementations of the present disclosure can realize one or more of the following advantages. These systems and methods can improve personnel and environmental safety. For example, gas leaks can be detected sooner, that is, before the gas leak expands to a size where, when ignited, it would cause significant equipment damage or a large loss of life. In some instances, the gas leak can be ignited before reaching the vicinity of people. For example, the gas leak can be detected and ignited before a significant level of gas leaks to the environment, contaminating the area surrounding the gas leak. For example, oil field workers can control and ignite the gas leak from a greater distance from the gas leak.

These systems and methods can reduce the time required to ignite a gas leak. For example, detecting, positioning, and igniting the gas leak autonomously or semi-autonomously with the unmanned vehicle can reduce the time to ignite the gas leak.

These systems and methods also can increase well, pipeline, refinery plant, and processing facility operational time. For example, by identifying the gas leak sooner, the wells, pipelines, refinery plants, and processing facilities can be restored to full operation sooner.

The systems and methods can decrease emergency detection and alert time. For example, the unmanned surface vehicle or unmanned aerial vehicle can act as a first responder to investigate and validate gas presence by integrating gas sensors prior, during, and after uncontrolled gas leaks and during the ignition process.

The systems and methods can decrease the time to respond to a gas leak emergency. For example, the unmanned surface vehicle or unmanned aerial vehicle can operate autonomously, semi-autonomously, and manually using an onboard processor to analyze and assess weather conditions, visualize a gas leak cloud, create and adjust flight plan with best approaching altitude and route to the ignition zone. The gas cloud and dispersion modeling are used in the intelligent ignition strategy.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure relates to identifying and remediating a gas leak with an unmanned surface vehicle or an unmanned aerial vehicle. In this approach, after a gas leak is detected, an unmanned vehicle (e.g., an unmanned surface vehicle or an unmanned aerial vehicle) is positioned near the gas leak. An ignition source is discharged from the unmanned vehicle into the gas leak to ignite the gas leak.

Figure 1:
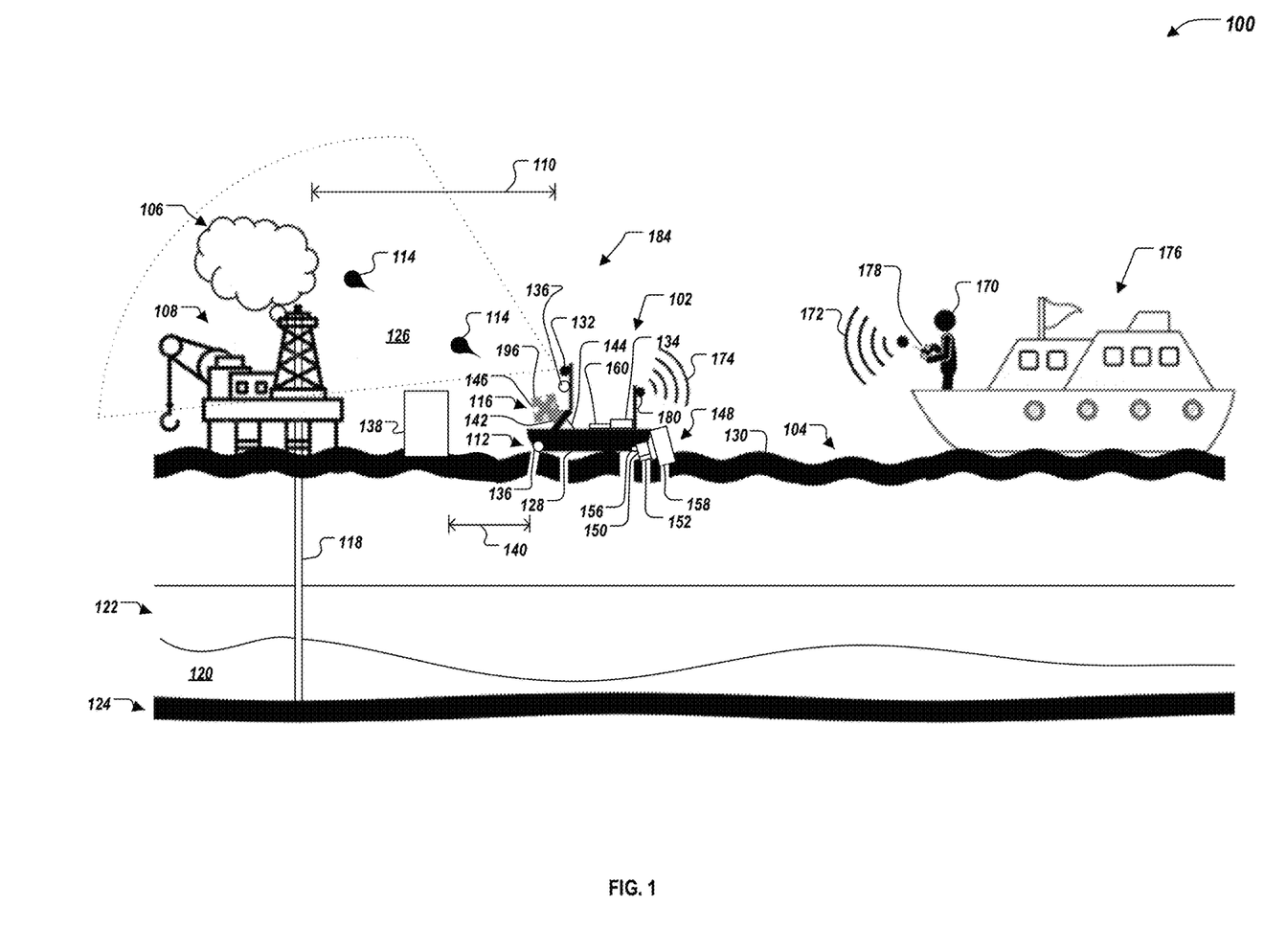
FIG. 1 shows an unmanned surface vehicle system identifying and remediating a gas leak.

FIG. 1 shows of an unmanned surface vehicle system 100 identifying and remediating a gas leak. The unmanned surface vehicle system 100 includes a unmanned surface vehicle 102 floating on a body of water 104 near a gas leak 106 from a facility 108 for producing, transferring, or processing gas. The unmanned surface vehicle 102 is or can be maneuvered close enough to detect the gas leak 106 from the facility 108 or maneuver within a distance 110 sufficient to detect the gas leak 106. The unmanned surface vehicle 102 detects the gas leak 106 and moves to a location 112 near enough to the gas leak 106 to discharge an ignition source 114 from an ignition mechanism 116 into the gas leak 106 to ignite the gas leak 106. The unmanned surface vehicle 102 uses a gas leak sensor 126 such as thermal infrared optical gas imagery sensors or laser absorption sensors for remote gas detections. The unmanned surface vehicle 100 can be deployed in an ongoing monitoring role or in response to indications of the gas leak 106. The unmanned surface vehicle 100 can be used to monitor gas drilling and detect gas leaks 106 proactively. It can act as a first responder to investigate and validate gas leaks 106 presence by integrating gas leak sensors 126.

The facility 108 is an offshore drilling rig. The offshore drilling rig is positioned in the body of water 104 to drill and complete a wellbore 118 in a subterranean formation 120 the Earth 122. The subterranean formation 120 contains fluids 124 in the form of liquids and gases such as hydrocarbons and water. The fluids 124 can be pressurized. The fluids 124 flow from the subterranean formation 120 through the wellbore 118 and up to the facility 108. In some cases, the fluids 124 can leak, flow, or be emitted from the facility 108 in an manner creating the gas leak 106. For example, a component such as a pipe, a valve, a seal, a tube, or a tank can fail or rupture allowing the fluids 124 to exit the component and generating the gas leak 106. Although illustrated as offshore drilling rig, this approach can be applied to other facilities (e.g., offshore gas processing facilities, onshore gas processing facilities, onshore drilling rigs, pipelines, and tankers).

The gas leak 106 contains the fluids 124 in form of liquids and gases, some of which flammable and/or explosive. When the fluids 124 are released into an environment 126 surrounding the facility 108, the fluids 124 can damage the facility 108 or harm personnel working on the facility 108. Alternatively or in addition, the fluids 124 can pollute or contaminate the environment 126. Igniting the fluids 124 in the gas leak 106 can reduce damage to the facility 108, increase personnel safety, and reduce environmental pollution. In some cases, the fluids 124 exit the gas leak 106 and are deposited on the body of water 104.

Referring to FIG. 1, the unmanned surface vehicle 102 has a hull 128 which floats on the body of water 104. The unmanned surface vehicle 102 operates, that is, maneuvers, detects, and discharges the ignition source 114 while positioned on a surface 130 of the body of water 104 The hull 128 is an enclosure which displaces a portion of the body of water 104. In some cases, the hull 128 partially encloses the unmanned surface vehicle 102. In some cases, the hull 128 fully or nearly fully encloses the unmanned surface vehicle 102. In some cases, the unmanned surface vehicle 102 can partially or fully submerge into the body of water 104, that is, below the surface 103.

Figure 2:
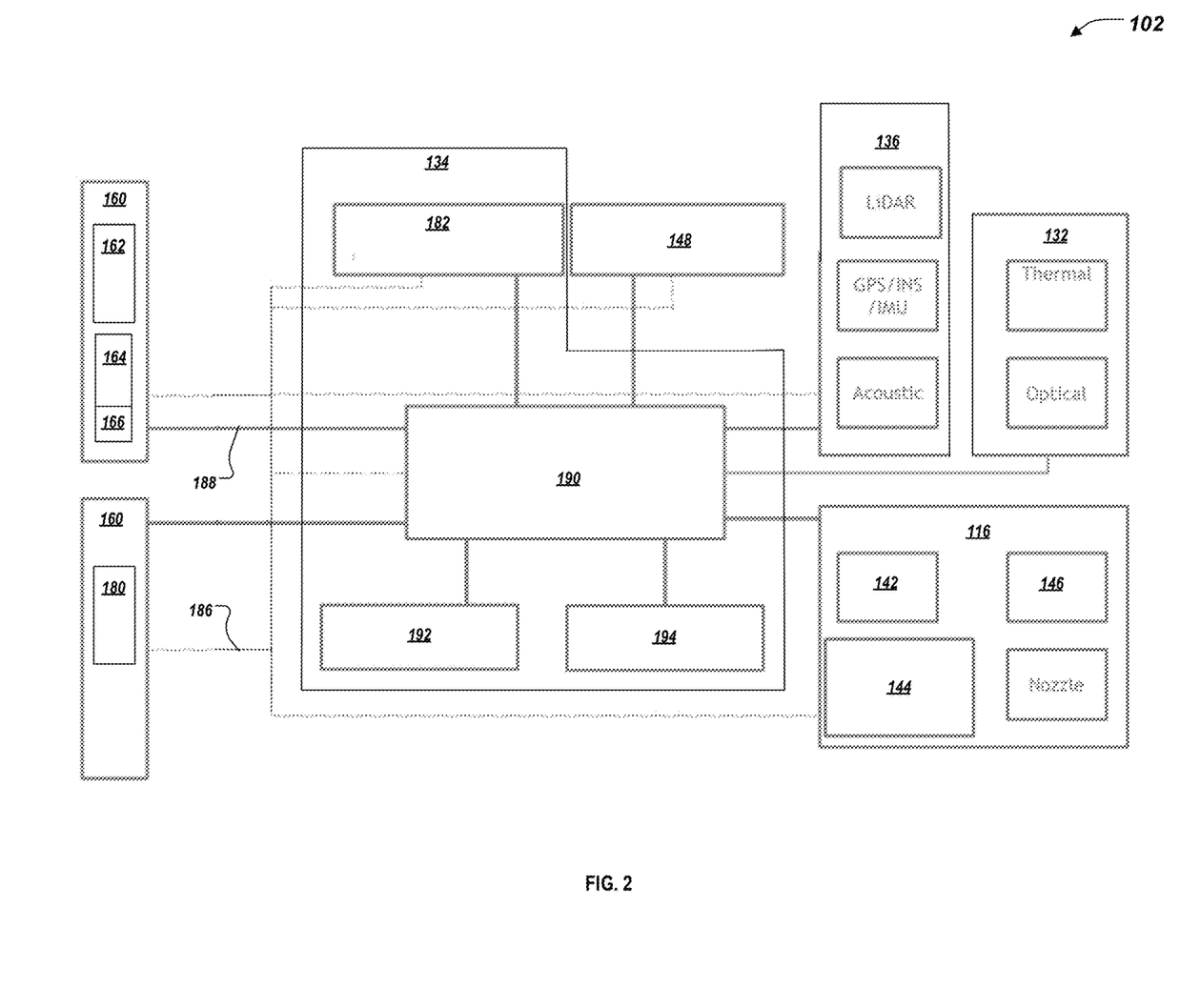
FIG. 2 is a schematic view of a of the unmanned surface vehicle of FIG. 1.

FIG. 2 is a schematic view of the unmanned surface vehicle of FIG. 1. Referring to FIGS. 1 and 2, the unmanned surface vehicle 102 has a gas leak sensor 132 which detects a condition indicative of the gas leak 106 and sends a signal representing the condition indicative of the gas leak 106 to a controller 134 of the unmanned surface vehicle 102. Features and operation of the controller 134 are described in more detail in reference to FIG. 2.

The gas leak sensor 132 can be a thermal camera and/or an optical camera. The thermal camera detects a temperature difference of fluid 124 of the gas leak 106 and the environment 126. The temperature can be a condition indicative of the gas leak 106 in the environment 126. The temperature difference between the gas leak 106 and the environment 126 can be indicative of the presence the fluids 124 exiting from the facility 108 into the environment 126. In some cases, the thermal camera can determine the size or extent of the gas leak 106. The gas leak sensors 132 are onboard localized gas leak sensors 132 which can be used to sniff or sample the environment 126 for presence of gas above or below a lower explosive limit and/or perform remote sensing by thermal infrared camera sensor for optical gas imaging or laser absorption sensors.

The optical camera receives light from the environment 126 including light from or through the gas leak 106. The optical camera spectrally filters the light from the gas leak 106 and identifies the types of fluids 124 in the gas leak 106. The light spectrum of the environment 126 and the gas leak 106 can be a condition indicative of the controlled gas leak into the environment 126. In some cases, the optical camera can determine the size or extent of the gas leak 106. The optical camera can be an infrared thermal imaging camera. The optical camera output can be correlated with thermal camera to precisely detect, localize and track gas leak source and cloud (gas mixture). The optical camera can include features such as auto tracking, zooming, and focus for stability and precise localization of the gas leak 106.

In some implementations, the gas leak sensor 132 receives or samples a portion of the environment 126 containing the gas leak 106 (e.g., an air sample or a water sample) and subsequently analyzes the portion of the environment 126 to determine the type and concentration of fluids 124 in the gas leak 106. For example, the gas leak sensor 132 can be an electrochemical sensor, a catalytic sensor, or a photoionization sensor. The gas leak sensors 132 are onboard localized gas sensors 132 which can be used to sniff or sample the environment 126 for presence of gas at, above, or below the lower explosive limit and/or perform remote sensing by the thermal infrared sensor for optical gas imaging or laser absorption sensors.

The unmanned surface vehicle 102 has an environmental sensor 136 detects an environmental condition indicative of the environment 126 near the gas leak 106 and/or the unmanned surface vehicle 102 (when the unmanned surface vehicle is not near or is far away from the gas leak 106). The environmental sensor 136 sends a signal representing the condition indicative of the environment 126 to the controller 134 of the unmanned surface vehicle 102. Operations of the controller 134 relative to the environmental sensor 136 are described in reference to FIG. 2. The environmental sensor 136 can be one or more of a camera, a radar, a global positioning system, an inertial navigation system, an acoustic sensor, a laser, a light detection and ranging (LIDAR) sensor, a temperature sensor, a pressure sensor, a humidity, a wind speed sensor, a wind direction sensor, a water current speed sensor, a water current direction sensor, or a water temperature sensor.

The camera of the environmental sensor 136 can visually detect conditions indicative of the environment 126 such as obstacles 138 in, on, or above the body of water 104. For example, obstacles 138 can be other offshore oil rigs, boats, ships, buoys, other unmanned surface vehicles, unmanned aerial vehicles, planes, people, or land features.

The radar the environmental sensor 136 can transmit and receive radar waves to detect conditions indicative of the environment such as obstacles 138 in, on, or above the body of water 104. For example, obstacles 138 can be other offshore oil rigs, boats, ships, buoys, other unmanned surface vehicles, unmanned aerial vehicles, planes, people, or land features.

The global positioning system of the environmental sensor 136 can detect multiple satellite signals. The satellite signals can be compiled or triangulated to determine a position of the unmanned surface vehicle 102 on the surface 130 of the body of water 104.

The inertial navigation system of the environmental sensor 136 can detect relative motion of the unmanned surface vehicle 102. The relative motion of the unmanned surface vehicle indicates a speed and direction of the unmanned surface vehicle 102 relative to the environment 126 across or through the body of water 104. The inertial navigation system can include a gyroscope, a magnetometer, and an accelerometer to calculate and report the speed, direction, and acceleration of the unmanned surface vehicle 102, wind speed and direction, and angular rate of the unmanned surface vehicle 102.

The acoustic sensor of the environmental sensor 136 can transmit and receive acoustic signals into the body of water 104. The acoustic sensor can be positioned on the hull 128 in the body of water 104. The acoustic sensor can detect the obstacles. The controller 134 can receive and process the signals from the acoustic sensor for collision avoidance of the obstacles 138.

The laser for light detection and ranging (LIDAR) sensor of the environmental sensor 136 can detect a range. For example, the LIDAR sensor can detect the distance 110 to the facility or a distance 140 from the unmanned surface vehicle 102 to the obstacles 138.

The temperature sensor of the environmental sensor 136 can detect an ambient temperature of the environment 126. The ambient temperature can be the condition indicative of the environment 126. The pressure sensor of the environmental sensor 136 can detect an ambient pressure of the environment 126. The ambient pressure can be a condition indicative of the environment 126. The humidity sensor of the environmental sensor 136 can detect an ambient humidity of the environment 126. The ambient humidity can be a condition indicative of the environment 126.

The wind speed sensor of the environmental sensor 136 can detect an relative wind speed and/or an actual wind speed of the environment 126 near the unmanned surface vehicle 102. The relative wind speed and an actual wind speed can be a condition indicative of the environment 126. The wind direction sensor can detect an actual wind direction and/or a relative wind direction from the unmanned surface vehicle 102. In some cases, the controller 134 can use the relative wind speed, the actual wind speed, the relative wind direction, and/or the actual wind direction to determine a set (a direction of travel of the controlled gas leak from the facility 108) and a drift (a speed of movement or rate of expansion) of the gas leak 106 from the facility 108.

The water current speed sensor of the environmental sensor 136 can detect an relative water current speed and/or an actual water current speed of the body of water 104 near the unmanned surface vehicle 102. The relative water current speed and an actual water current speed can be a condition indicative of the environment 126. The water current direction sensor can detect an actual water current direction and/or a relative water current direction from the unmanned surface vehicle 102. The relative water current direction and an actual water current direction can be the condition indicative of the environment 126. In some cases, the controller 134 can use the relative water current speed, the actual water current speed, the relative water current direction, and/or the actual water current direction to determine a set (a direction of travel of the unmanned surface vehicle 102 relative to the facility 108) and a drift (a speed of movement relative to the facility 108).

The water temperature sensor of the environmental sensor 136 can detect a water temperature of the body of water 104. The water temperature can be the condition indicative of the environment 126.

The unmanned surface vehicle 102 includes the ignition mechanism 116 mounted to the unmanned surface vehicle 102 to discharge the ignition source 114 into the gas leak 106 to ignite the gas leak. The ignition mechanism 116 is mounted in an gimbal 142 which articulates to aim the ignition mechanism at the gas leak 106. The gimbal 142 can rotate or move the ignition mechanism 116 in two or more axis. Some vehicles include other aiming approaches. For example, the ignition mechanism 116 can be fixed in position relative to the hull and the vehicle maneuvered to aim the ignition source. The gimbal 142 can include a gimbal control logic which is fed outputs from the gas leak sensor 132 and/or the environmental sensor 136 to precisely detect, localize and track gas leak 106 from the facility 108. The gimbal control logic can include features enabling auto tracking, zooming, and focusing on the gas leak 106 for stability of the unmanned surface vehicle 102 and precise localization of the gas leak 106.

The ignition mechanism 116 includes a fuel source 144 and an actuator 146 to ignite the ignition source 114 as a fuel from the fuel source 144 exits the ignition mechanism 116 to turn the fuel into the ignition source 114. The actuator 146 can be a spark plug, a pilot flame, a hot wire, an electrical arc source, a firework, a sparking, source, or a laser source.

The fuel source 144 contains the fuel which is discharged and ignited to ignite the gas leak 106. The fuel source 144 can be a cylinder, a pressure vessel, a cartridge loader, an electric battery, a laser amplifier, or a filament.

The fuel can be a flammable gas which can flow (discharge) from the ignition mechanism 116 as a gas stream which is then ignited by the actuator 146 (like the spark plug or pilot flame) to create a flammable gas stream from the ignition mechanism 116 to ignite the gas leak 106. In some cases, the flammable gas is expelled through one more nozzles 196 into the environment 126. In some cases, the nozzles 196 can actuate, that is, be aimed independently of the gimbal 142. The flammable gas stream can be discharged for a time period. The time period can be relatively short, that is, less than a second, between one second and minute, or continuously as long as the fuel source 144 contains fuel. When the flammable gas stream is relatively short, the flammable gas can be discharged from the ignition mechanism 116 as a flammable gas ball. The flammable gas can be propane, butane, oxyacetylene, gasoline, diesel fuel.

Alternatively or in addition, the fuel can be a flammable gel. The flammable gel can be discharged as a stream or discretely then ignited by the actuator 146. For example, a stream of flammable gel can be discharged from the ignition mechanism 116. For example, a cartridge containing the flammable gel can be ejected from the ignition mechanism 116. The cartridge can include the actuator, for example a spark emitter. The actuator in the cartridge can immediately ignite the flammable gel in the cartridge or the ignition can be delayed. For example, the ignition of the flammable gel cartridge can occur as the flammable gel cartridge moves toward the gas leak 106, just before the flammable gel cartridge enters the gas leak 106, right after the flammable gel cartridge enters the gas leak 106, or at a region of highest concentration of the fluid 124 in the gas leak 106. In some cases, the flammable gel includes gasoline, diesel fuel, or another fuel gel.

In some cases, the ignition source 114 is a spark emitter. For example, a device which periodically or continually emits sparks can be deployed into the gas leak 106, and then emit one or more sparks to ignite the gas leak 106. For example, the spark emitter can be an electrically or mechanically remotely triggered flare gun, a rifle discharging an incendiary round, remotely triggered fireworks, or a sparking filament.

In some cases, the controller 134 determines, after a first discharge at a first time, that based on the first condition of the gas leak 106 at a second time, that a second ignition source 114 is required for control the gas leak 106. In such a case, discharging the ignition source 114 into the gas leak 106 to ignite the gas leak 106 at a second time includes: detecting a condition or conditions indicative of the gas leak 106 continuing; sensing a second set of environmental conditions near the gas leak 106; receiving a signal representing the second condition indicative the gas leak 106 continuing and a signal representing the second set environmental conditions near the gas leak 106; determining based on the second condition indicative of the gas leak 106 and the second set environmental conditions near the gas leak 106, that another discharge by the ignition mechanism 116 into the gas leak 106 is needed; and discharging, by the ignition mechanism 116, the ignition source 114 into the gas leak 106 to ignite the gas leak 106 at the second time.

The unmanned surface vehicle 102 has a propulsion sub-system 148 to move the unmanned surface vehicle 102 across the surface 130 of the body of water 104, around obstacles 138, and near the facility 108 and the gas leak 106. The propulsion sub-system 148 has a motor 150 operatively controlled by the controller 134. For example, the motor 150 can be an electrical motor, a gasoline motor, or a diesel motor which can be turned on, turned off, sped up, or slowed down by the controller 134. The propulsion sub-system 148 has a propeller 152 with blades coupled to the motor 150 to apply a force by the blades to the body of water 104 to move the unmanned surface vehicle 102 across or through the body of water 104. Alternatively or in addition, the unmanned surface vehicle 102 can have one or more water jets 154 powered by the motor 150 to flow a portion of the body of water 104 to propel the unmanned surface vehicle 102 across or through the body of water 104. The water jets 154 can increase or decrease a rate of flow of the portion of the body of water 104 to increase or decrease a speed of the unmanned surface vehicle 102. The water jets 154 can articulate to change a direction of travel of the unmanned surface vehicle 102. The propulsion sub-system 148 has a rudder 158 coupled to the hull 128 which controls the direction of movement of the unmanned surface vehicle 102. The rudder 158 is operatively coupled to the controller 134.

The unmanned surface vehicle 102 has a power sub-system 160. The power sub-system includes a battery 162. The battery 162 can be a rechargeable battery or a replaceable battery. The power sub-system 160 includes an engine 164. The engine 164 can power an electrical generator 166 to provide power to the battery 162, the controller 134, or the other components of the unmanned surface vehicle 102. The power sub-system has power cables 186 (shown in FIG. 2) suppling power to the various components and sub-systems of the unmanned surface vehicle 102.

The unmanned surface vehicle 102 has a communication sub-system 168 (shown in FIG. 2) to receive control signals 172 from and transmit status signals 174 to a user 170. The user 170, as shown in FIG. 1, is on a manned surface vessel 176, i.e., a ship or boat. However, the user 170 can be located on another offshore oil rig or on land (i.e., at a control facility). The user 170 can transmit control signals 172 directly to the unmanned surface vehicle via a remote controller 178. When the user 170 is located on land, the user 170 can transmit the control signals 172 and receive the status signals 174 via a computer network, a radio signal from a radio tower, and/or a satellite communication network. The communication sub-system 168 includes an antenna 180 to receive control signals 172 from and transmit status signals 174 to the remote controller 178. In some case, the wireless communication can be directly from the controller 134 to the unmanned surface vehicle 102 or via a relay unit such as a wireless repeater or a satellite.

The unmanned surface vehicle 102 has navigation sub-system 182 (shown in FIG. 2). The navigation sub-system 182 receives the visual indications of obstacles 138 from the camera of the environmental sensor 136, the radar signals from the environmental sensor 136, the global positioning system satellite signals, inertial navigation system signals, the acoustic signals from the acoustic sensor, the laser for light detection and ranging (LIDAR) signals, and stored navigation charts and generates a navigation plan which includes the ignition zone 184 based on these inputs. The ignition zone 184 is the distance 110 between the unmanned surface vehicle 102 and the gas leak 106 within which the unmanned surface vehicle 102 can discharge the ignition source 114 to ignite the gas leak 106. The controller 134 operates the other sub-systems and components of the unmanned surface vehicle 102 based on the navigation plan. The navigation plan is a two or three dimensional plan that is developed by the controller 134 based on the inputs from the gas leak sensor 132, the environmental sensor 136, and control signals 172 from the user 170 to position the unmanned surface vehicle 102 in the ignition zone avoid the obstacles 138. The navigation sub-system 182 can update the navigation plan in real-time, that is, while the unmanned surface vehicle 102 is moving.

Referring to FIG. 2, the controller 134 is operatively coupled to the gas leak sensor 132, the environmental sensor 136, the ignition mechanism 116, the propulsion sub-system 148, the communication sub-system 168, and the power sub-system 160. The controller 134 has control cables 188 to send control signals 172 and receive status signals 174 representing the conditions from the gas leak sensor 132, the environmental sensor 136, the ignition mechanism 116, the propulsion sub-system 148, the communication sub-system 168, and the power sub-system 160. The controller 134 controls and monitors the gas leak sensor 132, the environmental sensor 136, the ignition mechanism 116, the propulsion sub-system 148, the communication sub-system 168, and the power sub-system 160.

The controller 134 includes a computer 190. The computer 190 can be various forms of digital computers, such as printed circuit boards (PCB), processors, digital circuitry, or otherwise parts of a fracture geometry mapping system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 134 can include a processor 192, a memory 194, a storage device, and an input/output device which can be interconnected using a system bus. The processor 192 is capable of processing instructions for execution within the controller 134. The processor 192 may be designed using any of a number of architectures. For example, the processor may be a CISC (Complex Instruction Set Computers) processor, a RISC (Reduced Instruction Set Computer) processor, or a MISC (Minimal Instruction Set Computer) processor.

In one implementation, the processor 192 is a single-threaded processor. In another implementation, the processor 192 is a multi-threaded processor. The processor 192 is capable of processing instructions stored in the memory 194 or on the storage device to display graphical information for a user interface on the input/output device.

The memory 194 stores information within the controller 134. In one implementation, the memory 194 is a computer-readable medium. In one implementation, the memory 194 is a volatile memory unit. In another implementation, the memory 194 is a non-volatile memory unit.

The storage device is capable of providing mass storage for the controller 134. In one implementation, the storage device is a computer-readable medium. In various different implementations, the storage device may be a floppy disk device, a hard disk device, an optical disk device, or a tape device.

The input/output device provides input/output operations for the controller 134. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors 192 for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

Figure 3:
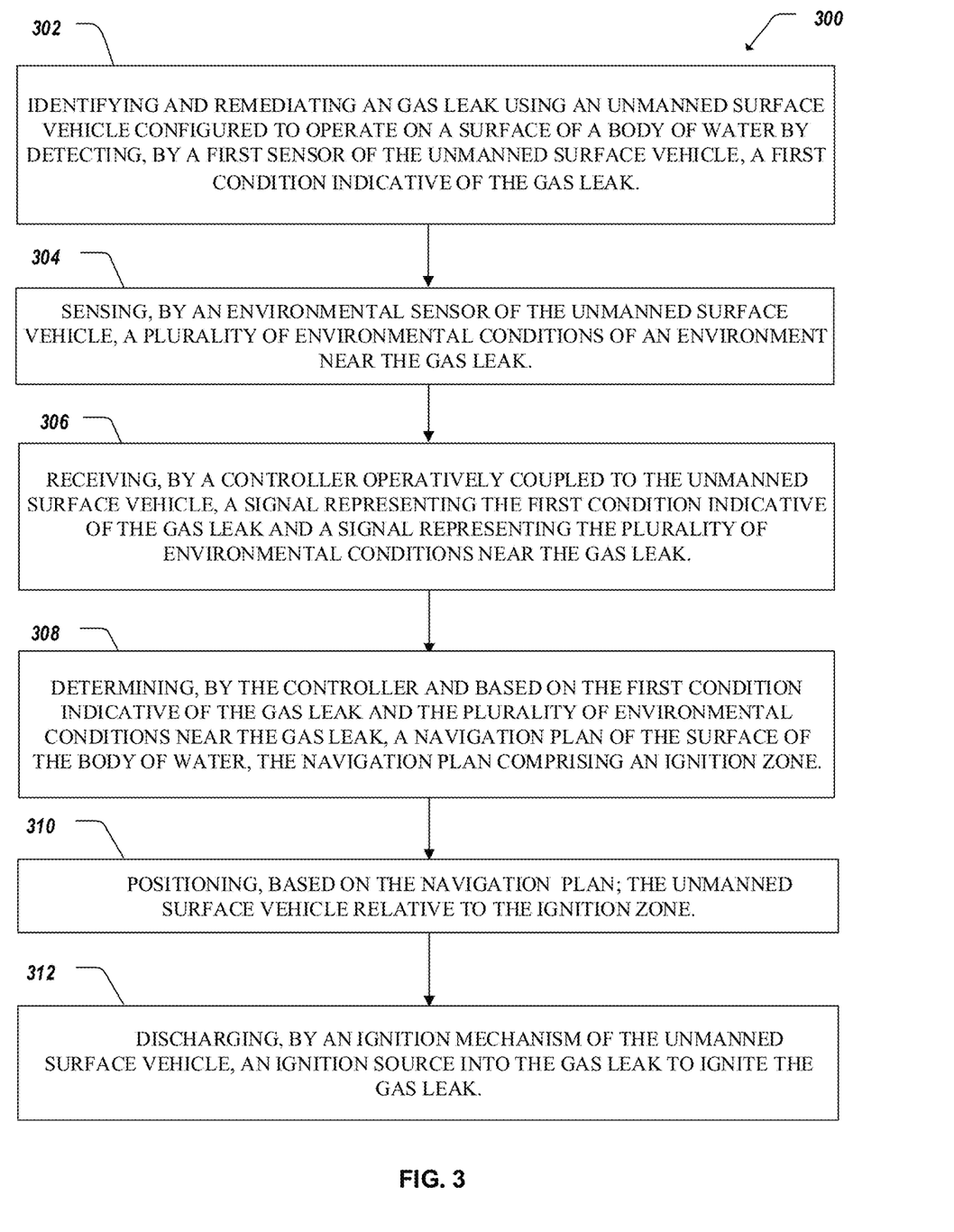
FIG. 3 is a flow chart of an example method of identifying and remediating a gas leak with a unmanned surface vehicle.

The controller 134 is configured to perform operations as described in detail in reference to FIG. 3. The controller 134 performs operations including detecting, by the gas leak sensor 132, a first condition indicative of the gas leak; sensing, by the environmental sensor 136, the environmental conditions; receiving the signals representing the conditions indicative of the gas leak 106 and the signals representing the environmental conditions near the gas leak 106 at the controller 134; determining the navigation plan of the body of water including the ignition zone 184 based on the conditions indicative of the gas leak 106 and environmental conditions near the gas leak 106; positioning the unmanned surface vehicle 102 based on the navigation plan relative to the ignition zone 184 around the obstacles 138; and discharging the ignition source 114 from the ignition mechanism 116 into the gas leak 106 to ignite the gas leak 106.

The controller 134 can operate in direct control by the user 170 controlling all the operations of the unmanned surface vehicle 102 such as navigating the unmanned surface vehicle 102 around obstacles 138 and commanding the ignition mechanism 116 to discharge the ignition source 114. That is, the unmanned surface vehicle 102 is operating in a "man in the loop" mode.

The unmanned surface vehicle 102 can operate semi-autonomously. When operating semi-autonomously, the controller 134 can determine the navigation plan based on the environmental conditions and maneuver the unmanned surface vehicle 102 into or near the ignition zone 184. The controller 134 may then transmit a status signal 174 to the user 170 indicating that the unmanned surface vehicle 102 is ready to discharge the ignition source 114 into the gas leak 106. The user 170 may or may not transmit the control signal 172 to discharge the ignition source 114. That is, the unmanned surface vehicle 102 is operating in a "man on the loop" mode.

The unmanned surface vehicle 102 can operate fully autonomously. When operating autonomously, the unmanned surface vehicle 102 performs all operations without control signals 172 from the user 170. That is, the unmanned surface vehicle 102 is continuously deployed and monitoring the environment 126 surround one or more facilities 108 for gas leaks 106 and may position and discharge the ignition source 114 one or more times as determined by the conditions of the gas leak 106 without user 170 intervention. That is, the unmanned surface vehicle 102 is operating in a "man out of the loop" mode.

FIG. 3 is a flow chart 300 of an example method of identifying and remediating a gas leak using an unmanned surface vehicle configured to operate on a surface of a body of water according to the implementations of the present disclosure. At 302, a first condition indicative of the gas leak is detected by a first sensor of the unmanned surface vehicle. In some cases, the first sensor is a thermal sensor and detecting the first condition indicative of the gas leak includes detecting a temperature difference of the gas leak relative to the environment. In some cases, the first sensor is an optical sensor and detecting the first condition indicative of the gas leak includes detecting an optical parameter of the gas leak relative to the environment. In some cases, the gas leak is from an offshore gas processing facility, an onshore gas processing facility, an offshore drilling rig, an onshore drilling rig, or a pipeline. For example, the gas leak sensor 132 on the unmanned surface vehicle 102 can detect the gas leak 106.

At 304, multiple environmental conditions of an environment near the gas leak are sensed by an environmental sensor of the unmanned surface vehicle. In some cases, the environmental conditions include at least one of wind speed, wind direction, ambient temperature, humidity, pressure, an obstacle, water current speed, water current direction, or water temperature. For example, one or more of the environmental sensors 136 on the unmanned surface vehicle 102 can detect environmental conditions of the environment 126 and/or the body of water 104 including obstacles 138.

At 306, a signal representing the first condition indicative of the gas leak and a signal representing the environmental conditions near the gas leak are received by a controller operatively coupled to the unmanned surface vehicle. For example, the controller 134 receives the signals from the gas leak sensor 132 and the environmental sensors 136.

At 308, a navigation plan including an ignition zone of the surface of the body of water based on the first condition indicative of the gas leak and the environmental conditions near the gas leak is determined by the controller. In some cases, determining the navigation plan includes determining a starting location of the unmanned surface vehicle, determining of a source of the gas leak, and determining a route having multiple waypoints from the starting location to the ignition zone. Determining the navigation plan can include determining an geographic coordinate for each of the waypoints. For example, the navigation sub-system 182 can generate the navigation plan to move the unmanned surface vehicle 102 around the obstacles 138 and near the facility 108 so the ignition mechanism 116 can discharge the ignition source 114 into the gas leak 106.

At 310, the unmanned surface vehicle is positioned relative to the ignition zone based on the navigation plan. For example, the controller 134 sends command signals to the propulsion sub-system 148 to operate and maneuver the unmanned surface vehicle 102 around the obstacles 138 and into the ignition zone 184 according to the navigation plan.

At 312, an ignition source is discharged by an ignition mechanism of the unmanned surface vehicle into the gas leak to ignite the gas leak. In some cases, discharging, by the ignition mechanism of the unmanned surface vehicle, the ignition source into the gas leak includes aiming the ignition mechanism at the gas leak. In some cases, the ignition source is a flame, a flammable gel, a fire ball, or a spark. For example, the controller 134 sends command signals to the gimbal 142 to actuate the ignition mechanism 116 aiming the nozzle 196 at the gas leak 106. The controller 134 then sends another command signal to the ignition mechanism 116 to discharge the ignition source 114 from the fuel source 144 and a command signal to the actuator 146 to ignite the ignition source 114.

In some cases, discharging the ignition source into the gas leak to ignite the gas leak is at a first time, and at a second time after the first time the method includes: detecting, by the first sensor; a second condition indicative of the gas leak continuing; sensing, by the environmental sensor, a second set of environmental conditions near the gas leak; receiving, by the controller, a signal representing the second condition indicative the gas leak continuing and a signal representing the second set environmental conditions near the gas leak; determining, by the controller and based on the second condition indicative of the gas leak and the second set environmental conditions near the gas leak, that another discharge by the ignition mechanism into the gas leak is needed; and discharging, by the ignition mechanism, the ignition source into the gas leak to ignite the gas leak at the second time.

Similar systems and approaches can be implemented using unmanned aerial vehicles rather than or in addition to unmanned surface vehicles.

Figure 4:
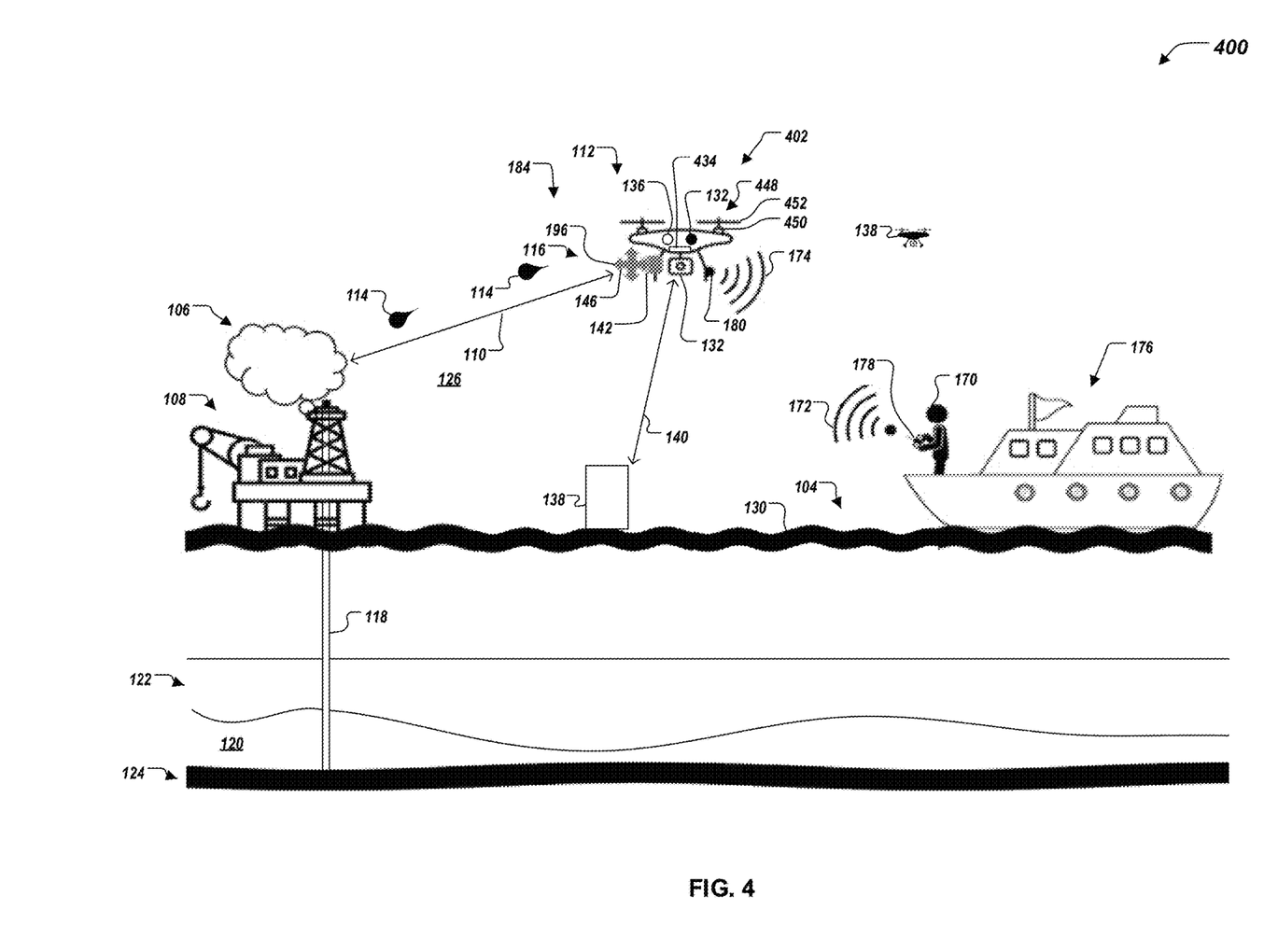
FIG. 4 shows an unmanned aerial vehicle system identifying and remediating a gas leak.

FIG. 4 shows an unmanned aerial vehicle system 400 identifying and remediating a gas leak. The unmanned aerial vehicle system 400 includes a unmanned aerial vehicle 402 flying above the body of water 104. The unmanned aerial vehicle 402 is near the gas leak 106 flowing from the facility 108 containing gas. That is, the unmanned aerial vehicle 402 is near enough to detect the gas leak 106 from the facility 108 or maneuver within the distance 110 sufficient to detect the gas leak 106. The unmanned aerial vehicle 402 detects the gas leak 106 and positions at the location 112 near enough to the gas leak 106 to discharge the ignition source 114 from the ignition mechanism 116 into the gas leak 106 to ignite the gas leak 106.

Figure 5:
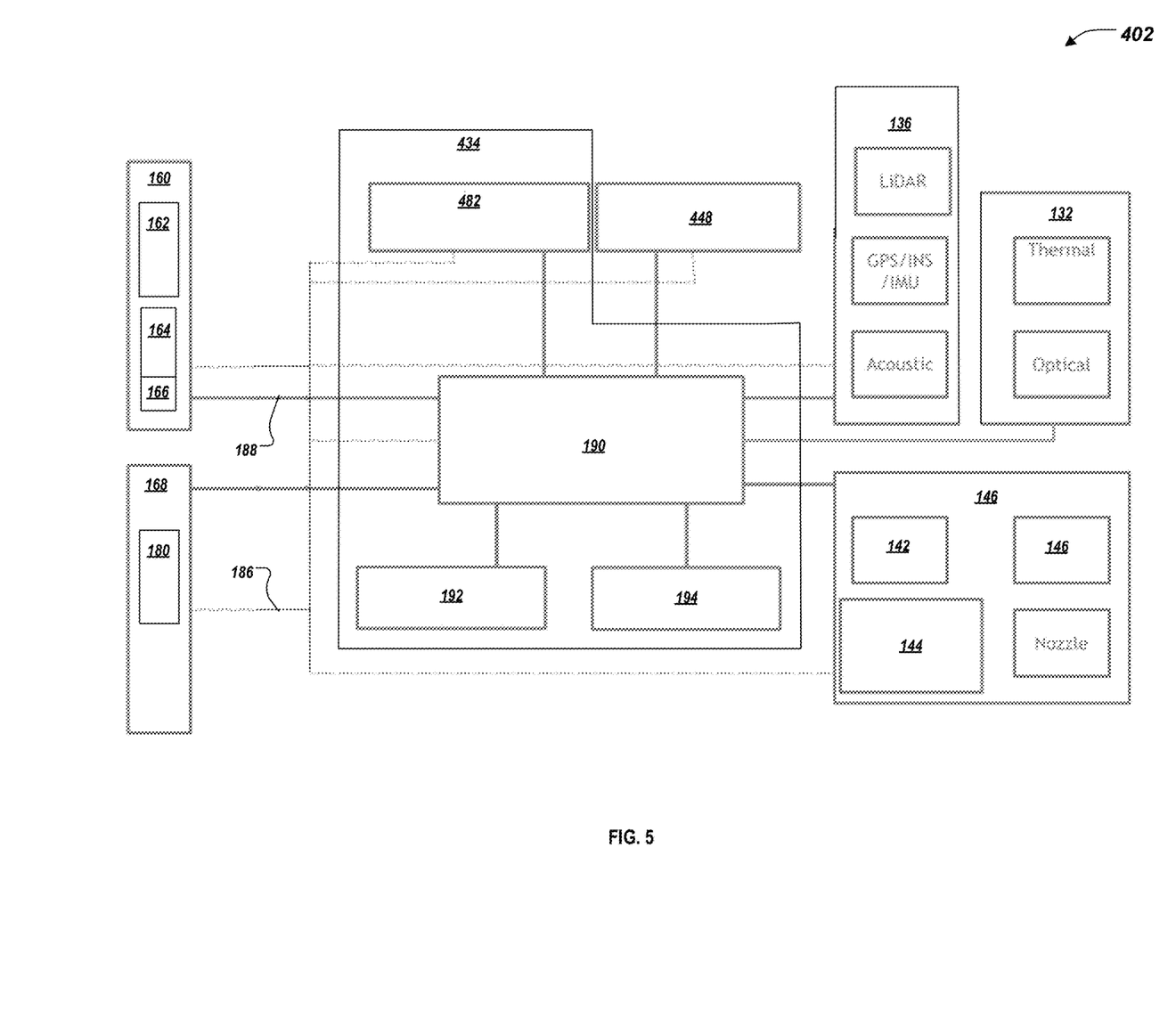
FIG. 5 is a schematic view of the unmanned aerial vehicle of FIG. 4.

FIG. 5 is a schematic view of the unmanned aerial vehicle of FIG. 4. Referring to FIGS. 4 and 5, the unmanned aerial vehicle 402 has a gas leak sensor 132 which detects a condition indicative of the gas leak 106 and sends a signal representing the condition indicative of the gas leak 106 to a controller 434 of the unmanned aerial vehicle 402. Features and operation of the controller 434 are described in more detail in reference to FIG. 5.

Although many of the systems of the unmanned aerial vehicle 402 are substantially similar to those of the unmanned surface vehicle 102, a propulsion sub-system 448, a navigation sub-system 482, and the controller 434 of the unmanned aerial vehicle 402 are generally different.

The unmanned aerial vehicle 402 has propulsion sub-system 448 to position the unmanned aerial vehicle 402 through the environment 126, around or above obstacles 138, and near the facility 108 and the gas leak 106. The propulsion sub-system 448 has a motor 450 operatively controlled by the controller 434. For example, the motor 450 can be an electrical motor, a gasoline motor, or a diesel motor which can be turned on, turned off, sped up, or slowed down by the controller 434. The propulsion sub-system 448 has propeller 452 with blades coupled to the motor 450 to apply a force by the blades to move the unmanned aerial vehicle 402 through environment 126.

The unmanned aerial vehicle 402 has navigation sub-system 482 (shown in FIG. 5). The navigation sub-system 482 receives the visual indications of obstacles 138 from the camera of the environmental sensor 136, the radar signals from the environmental sensor 136, the global positioning system satellite signals, inertial navigation system signals, the acoustic signals from the acoustic sensor, the laser for light detection and ranging (LIDAR) signals, and stored navigation charts and generates a flight plan which includes an ignition zone 484 based on these inputs. The ignition zone 484 is the distance 110 between the unmanned aerial vehicle 402 and the gas leak 106 within which the unmanned aerial vehicle 402 can discharge the ignition source 114 to ignite the gas leak 106. The controller 434 operates the other sub-systems and components of the unmanned aerial vehicle 402 based on the flight plan. The flight plan is a two or three dimensional plan that is developed by the controller 434 based on the inputs from the gas leak sensor 132, the environmental sensor 136, and control signals 172 from the user 170 to position the unmanned aerial vehicle 402 in the ignition zone avoid the obstacles 138. The navigation sub-system 482 can update the flight plan in real-time, that is, while the unmanned aerial vehicle 402 is moving.

Referring to FIG. 5, the controller 434 is operatively coupled to the gas leak sensor 132, the environmental sensor 136, the ignition mechanism 116, the propulsion sub-system 448, the communication sub-system 168, and the power sub-system 160. The controller 434 has control cables 188 to send control signals 172 and receive status signals 174 representing the conditions from the gas leak sensor 132, the environmental sensor 136, the ignition mechanism 116, the propulsion sub-system 448, the communication sub-system 168, and the power sub-system 160. The controller 434 controls and monitors the gas leak sensor 132, the environmental sensor 136, the ignition mechanism 116, the propulsion sub-system 448, the communication sub-system 168, and the power sub-system 160.

The controller 434 is configured to perform operations as described in detail in reference to FIG. 5. The controller 434 performs operations including detecting, by the gas leak sensor 132, a first condition indicative of the gas leak; sensing, by the environmental sensor 136, the environmental conditions; receiving the signals representing the conditions indicative of the gas leak 106 and the signals representing the environmental conditions near the gas leak 106 at the controller 434; determining the flight plan including the ignition zone 484 based on the conditions indicative of the gas leak 106 and environmental conditions near the gas leak 106; positioning the unmanned aerial vehicle 402 based on the flight plan relative to the ignition zone 484 around, above, or below the obstacles 138; and discharging the ignition source 114 from the ignition mechanism 116 into the gas leak 106 to ignite the gas leak 106.

The controller 434 can operate in direct control by the user 170 controlling all the operations of the unmanned aerial vehicle 402 such as navigating the unmanned aerial vehicle 402 around, above, or below obstacles 138 and commanding the ignition mechanism 116 to discharge the ignition source 114. That is, the unmanned aerial vehicle 402 is operating in a "man in the loop" mode.

The unmanned aerial vehicle 402 can operate semi-autonomously. When operating semi-autonomously, the controller 434 can determine the flight plan based on the environmental conditions and maneuver the unmanned aerial vehicle 402 into or near the ignition zone 484. The controller 434 may then transmit the status signal 174 to the user 170 indicating that the unmanned aerial vehicle 402 is ready to discharge the ignition source 114 into the gas leak 106. The user 170 may or may not transmit the control signal 172 to discharge the ignition source 114. That is, the unmanned aerial vehicle 402 is operating in a "man on the loop" mode.

The unmanned aerial vehicle 402 can operate fully autonomously. When operating autonomously, the unmanned aerial vehicle 402 performs all operations without control signals 172 from the user 170. That is, the unmanned aerial vehicle 402 is continuously deployed and monitoring the environment 126 surround one or more facilities 108 for gas leaks 106 and may position and discharge the ignition source 114 one or more times as determined by the conditions of the gas leak 106 without user 170 intervention. That is, the unmanned aerial vehicle 402 is operating in a "man out of the loop" mode.

Figure 6:
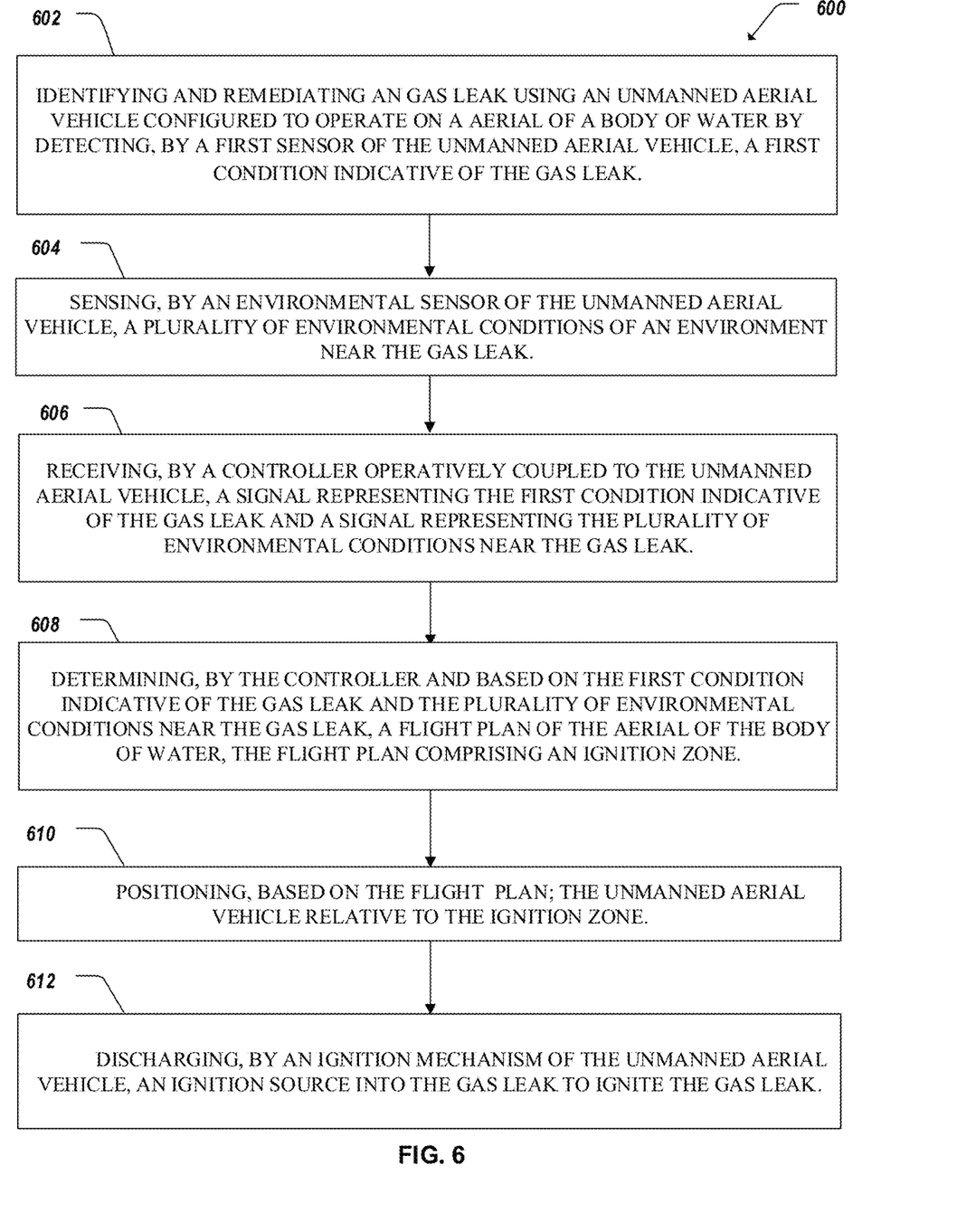
FIG. 6 is a flow chart of an example method of identifying and remediating a gas leak with a unmanned aerial vehicle.

FIG. 6 is a flow chart 600 of an example method of identifying and remediating a gas leak using an unmanned aerial vehicle according to the implementations of the present disclosure. At 602, a first condition indicative of the gas leak is detected by a first sensor of the unmanned aerial vehicle. In some cases, the first sensor is a thermal sensor and detecting the first condition indicative of the gas leak includes detecting a temperature difference of the gas leak relative to the environment. In some cases, the first sensor is an optical sensor and detecting the first condition indicative of the gas leak includes detecting an optical parameter of the gas leak relative to the environment. In some cases, the gas leak is from an offshore gas processing facility, an onshore gas processing facility, an offshore drilling rig, an onshore drilling rig, or a pipeline. For example, the gas leak sensor 132 on the unmanned aerial vehicle 402 can detect the gas leak 106.

At 604, multiple environmental conditions of an environment near the gas leak are sensed by an environmental sensor of the unmanned aerial vehicle. In some cases, the environmental conditions include at least one of wind speed, wind direction, ambient temperature, humidity, pressure, an obstacle, water current speed, water current direction, or water temperature. For example, one or more of the environmental sensors 136 on the unmanned aerial vehicle 402 can detect environmental conditions of the environment 126 and/or the body of water 104 including obstacles 138.

At 606, a signal representing the first condition indicative of the gas leak and a signal representing the environmental conditions near the gas leak are received by a controller operatively coupled to the unmanned aerial vehicle. For example, the controller 434 receives the signals from the gas leak sensor 132 and the environmental sensors 136.

At 608, a flight plan including an ignition zone based on the first condition indicative of the gas leak and the environmental conditions near the gas leak is determined by the controller. In some cases, determining the flight plan includes determining a starting location of the unmanned aerial vehicle, determining of a source of the gas leak, and determining a route having multiple waypoints from the starting location to the ignition zone. Determining the flight plan can include determining an geographic coordinate and an altitude for each of the waypoints. For example, the navigation sub-system 482 can generate the flight plan to move the unmanned aerial vehicle 402 around the obstacles 138 and near the facility 108 so the ignition mechanism 116 can discharge the ignition source 114 into the gas leak 106.

At 610, the unmanned aerial vehicle is positioned relative to the ignition zone based on the flight plan. For example, the controller 434 sends command signals to the propulsion sub-system 448 to operate and maneuver the unmanned aerial vehicle 402 around, above, or below the obstacles 138 and into the ignition zone 484 according to the flight plan.

At 612, an ignition source is discharged by an ignition mechanism of the unmanned aerial vehicle into the gas leak to ignite the gas leak. In some cases, discharging, by the ignition mechanism of the unmanned aerial vehicle, the ignition source into the gas leak includes aiming the ignition mechanism at the gas leak. In some cases, the ignition source is a flame, a flammable gel, a fire ball, or a spark. For example, the controller 434 sends command signals to the gimbal 142 to actuate the ignition mechanism 116 aiming the nozzle 196 at the gas leak 106. The controller 434 then sends another command signal to the ignition mechanism 116 to discharge the ignition source 114 from the fuel source 144 and a command signal to the actuator 146 to ignite the ignition source 114.

In some cases, discharging the ignition source into the gas leak to ignite the gas leak is at a first time, and at a second time after the first time the method includes: detecting, by the first sensor; a second condition indicative of the gas leak continuing; sensing, by the environmental sensor, a second set of environmental conditions near the gas leak; receiving, by the controller, a signal representing the second condition indicative the gas leak continuing and a signal representing the second set environmental conditions near the gas leak; determining, by the controller and based on the second condition indicative of the gas leak and the second set environmental conditions near the gas leak, that another discharge by the ignition mechanism into the gas leak is needed; and discharging, by the ignition mechanism, the ignition source into the gas leak to ignite the gas leak at the second time.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A method for identifying and remediating a gas leak using an unmanned aerial vehicle, the method comprising:
    flying the unmanned aerial vehicle towards a possible location of the gas leak, the unmanned aerial vehicle having an ignition mechanism with a range which an ignition source discharged by the ignition mechanism travels;
    detecting, by a first sensor of the unmanned aerial vehicle, a first condition indicative of the gas leak;
    sensing, by an environmental sensor of the unmanned aerial vehicle, a plurality of environmental conditions of an environment near the gas leak;
    receiving, by a controller of the unmanned aerial vehicle, a signal representing the first condition indicative of the gas leak and a signal representing the plurality of environmental conditions near the gas leak, the controller configured to operate the unmanned aerial vehicle;
    determining, by the controller and based on the first condition indicative of the gas leak and the plurality of environmental conditions near the gas leak, i) an ignition zone defined by the range and ii) a flight plan to the ignition zone;
    positioning, based on the flight plan, the unmanned aerial vehicle within the ignition zone at a distance spaced apart from the gas leak based at least on the range of the ignition source to the gas leak; and
    discharging, from within the ignition zone, and at the distance spaced apart from the gas leak, by the ignition mechanism of the unmanned aerial vehicle, the ignition source into the gas leak to ignite the gas leak.

2. The method of claim 1, wherein the first sensor is a thermal sensor and detecting the first condition indicative of the gas leak comprises detecting a temperature difference of the gas leak relative to the environment.

3. The method of claim 1, wherein the first sensor is an optical sensor and detecting the first condition indicative of the gas leak comprises detecting an optical parameter of the gas leak relative to the environment.

4. The method of claim 1, wherein the plurality of environmental conditions comprises at least one of wind speed, wind direction, ambient temperature, humidity, pressure, an obstacle, or terrain.

5. The method of claim 1, wherein determining the flight plan comprises:
    determining a starting location of the unmanned aerial vehicle;
    determining of a source of the gas leak; and
    determining a route comprising a plurality of waypoints from the starting location to the ignition zone.

6. The method of claim 5, wherein determining the flight plan comprises determining an altitude for each of the plurality of waypoints.

7. The method of claim 1, wherein discharging, by the ignition mechanism of the unmanned aerial vehicle, the ignition source into the gas leak comprises aiming the ignition mechanism at the gas leak.

8. A method for identifying and remediating a gas leak using an unmanned aerial vehicle, the method comprising:
    flying the unmanned aerial vehicle towards a possible location of the gas leak, the unmanned aerial vehicle having an ignition mechanism with ranges within which ignition sources discharged by the ignition mechanism travels, wherein the ignition sources comprise at least one of a flame, a flammable gel, a fire ball, or a spark;
    detecting, by a first sensor of the unmanned aerial vehicle, a first condition indicative of the gas leak;
    sensing, by an environmental sensor of the unmanned aerial vehicle, a plurality of environmental conditions of an environment near the gas leak;
    receiving, by a controller of the unmanned aerial vehicle, a signal representing the first condition indicative of the gas leak and a signal representing the plurality of environmental conditions near the gas leak, the controller configured to operate the unmanned aerial vehicle;
    determining, by the controller and based on the first condition indicative of the gas leak and the plurality of environmental conditions near the gas leak, i) ignition zones defined by the ranges of each of the ignition sources and ii) a flight plan to each of the ignition zones;
    positioning, based on the flight plan, the unmanned aerial vehicle within at least one of the ignition zones at a distance spaced apart from the gas leak based at least on the range of the at least one ignition source; and
    discharging, from within the ignition zone corresponding to the at least one ignition source, and at the distance spaced apart from the gas leak, by the ignition mechanism of the unmanned aerial vehicle, the at least one ignition source into the gas leak to ignite the gas leak.

9. The method of claim 8 wherein discharging the ignition source into the gas leak to ignite the gas leak is at a first time, the method further comprises, at a second time after the first time:
    detecting, by the first sensor, a second condition indicative of the gas leak continuing;
    sensing, by the environmental sensor, a second plurality of environmental conditions near the gas leak;
    receiving, by the controller, a signal representing the second condition indicative the gas leak continuing and a signal representing the second plurality of environmental conditions near the gas leak;
    determining, by the controller and based on the second condition indicative of the gas leak and the second plurality of environmental conditions near the gas leak, that another discharge by the ignition mechanism into the gas leak is needed; and
    discharging, by the ignition mechanism, another of the at least one ignition sources into the gas leak to ignite the gas leak at the second time.

10. The method of claim 1, wherein the gas leak is from at least one of an offshore gas processing facility, an onshore gas processing facility, an offshore drilling rig, an onshore drilling rig, or a pipeline.

11. An unmanned aerial vehicle for controlling a gas leak, the unmanned aerial vehicle comprising:
    a gas leak sensor configured to detect a condition indicative of the gas leak;
    an environmental sensor configured to detect an environmental condition indicative of an environment near the gas leak;

an ignition mechanism configured to discharge an ignition source, the ignition mechanism with a range which the ignition source discharged by the ignition mechanism travels; and a controller operatively coupled to the gas leak sensor, the environmental sensor, and the ignition mechanism, the controller configured to perform operations comprising:

receiving a signal representing the condition of the gas leak from the gas leak sensor;

receiving the signal representing the condition of the gas leak from the environmental sensor;

determining, based on the condition of the gas leak, the environmental condition indicative of the environment near the gas leak, and the ignition source, an ignition zone defined by the range which the ignition source discharged by the ignition mechanism travels;

determining a flight plan to the ignition zone;

positioning, based on the flight plan, the unmanned aerial vehicle within the ignition zone at a distance spaced apart from the gas leak based at least on the range of the ignition source; and discharging from within the ignition zone, and at the distance spaced apart from the gas leak, the ignition source by the ignition mechanism into the gas leak to ignite the gas leak.

12. The unmanned aerial vehicle of claim 11, wherein the gas leak sensor comprises at least one of a thermal camera or an optical camera.

13. The unmanned aerial vehicle of claim 11, wherein the environmental sensor comprises at least one of camera, a radar, a global positioning system, an inertial navigation system, an acoustic sensor, a laser, a light detection and ranging (LIDAR) sensor, a temperature sensor, a pressure sensor, a humidity sensor, a wind speed sensor, or a wind direction sensor.

14. The unmanned aerial vehicle of claim 11, wherein the ignition mechanism comprises an actuator and at least one of a flammable gas source configured to flow a flammable gas stream or a flammable gas ball, a flammable gel source, or a spark emitter.

15. The unmanned aerial vehicle of claim 11, wherein the ignition mechanism comprises a gimbal configured to aim the ignition mechanism at the gas leak.

16. The unmanned aerial vehicle of claim 11, further comprising a propulsion sub-system configured to position the unmanned aerial vehicle, the propulsion sub-system comprising:

a motor operatively controlled by the controller; and a plurality of propellers coupled to the motor.

17. The unmanned aerial vehicle of claim 11, further comprising a power sub-system comprising a battery.

18. The unmanned aerial vehicle of claim 11, further comprising a communications sub-system comprising an antenna configured to transmit and receive control signals and status signals from the controller to a user.

19. A method comprising:

detecting a gas leak;

determining an ignition zone, the ignition zone defined by a range which an ignition source discharged by an ignition mechanism of an unmanned aerial vehicle travels;

determining a flight plan to the ignition zone;

positioning the unmanned aerial vehicle, based on the flight plan, within the ignition zone at a distance spaced apart from the gas leak; and discharging, from within the ignition zone, and at the distance spaced apart from the gas leak, by the unmanned aerial vehicle, the ignition source into the gas leak.

20. The method of claim 19, wherein positioning the unmanned aerial vehicle proximal to the gas leak within the ignition zone comprises positioning the unmanned aerial vehicle relative to an obstacle in the ignition zone to avoid the obstacle.

21. The method of claim 20, wherein the ignition zone is defined by the range in which the ignition mechanism of the unmanned aerial vehicle can deploy the ignition source into the gas leak such that the ignition source ignites the gas leak.

22. The method of claim 20, further comprising positioning the unmanned aerial vehicle in the ignition zone for the gas leak based on a condition indicative of the gas leak and an environmental condition indicative of an environment near the gas leak.

23. The unmanned aerial vehicle of claim 14, wherein the controller is further configured to perform operations comprising determining the ignition zone based on the actuator and the range of each the flammable gas stream, the flammable gas ball, the flammable gel source, and the spark emitter.

* * * * *

UNITED STATES PATENT AND TRADEMARK OFFICE
CERTIFICATE OF CORRECTION

PATENT NO. : 12,346,132 B2
APPLICATION NO. : 17/950763
DATED : July 1, 2025
INVENTOR(S) : Salem D. Al-Qahtani, Soliman A. Al-Walaie and Zahir Fartas It is certified that error appears in the above-identified patent and that said Letters Patent is hereby corrected as shown below:

In the Claims

Column 19, Line 32, Claim 13, after "of" insert --a--.

Column 20, Line 42, Claim 23, after "each" insert --of--.

Signed and Sealed this
Twenty-first Day of October, 2025

John A. Squires
*Director of the United States Patent and Trademark Office*